US011493967B2

(12) United States Patent
Vishnubhatla et al.

(10) Patent No.: US 11,493,967 B2
(45) Date of Patent: Nov. 8, 2022

(54) THERMAL SHUTDOWN WITH HYSTERESIS

(71) Applicant: THOMSON Licensing, Issy-les-Moulineaux (FR)

(72) Inventors: Subbu Vishnubhatla, Carmel, IN (US); Joseph Charles Cwick, III, Carmel, IN (US); Michael Ray Christian, Carmel, IN (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 15/996,402

(22) Filed: Jun. 1, 2018

(65) Prior Publication Data
US 2019/0369683 A1 Dec. 5, 2019

(51) Int. Cl.
*G06F 1/20* (2006.01)
*G06F 9/4401* (2018.01)
*G06F 1/3206* (2019.01)
*G06F 1/3296* (2019.01)

(52) U.S. Cl.
CPC ............ *G06F 1/206* (2013.01); *G06F 1/3206* (2013.01); *G06F 1/3296* (2013.01); *G06F 9/442* (2013.01)

(58) Field of Classification Search
CPC ........ G06F 1/206; G06F 9/442; G06F 1/3296; G06F 1/3206
USPC .......................................................... 320/153
See application file for complete search history.

(56) References Cited

U.S. PATENT DOCUMENTS

| | | | | | |
|---|---|---|---|---|---|
| 4,827,288 | A | * | 5/1989 | Mori | B41J 2/355 347/188 |
| 5,796,280 | A | * | 8/1998 | Tuozzolo | H03K 3/2893 327/205 |
| 6,745,138 | B2 | * | 6/2004 | Przydatek | G01D 4/004 702/57 |
| 7,084,378 | B2 | * | 8/2006 | Griffin | F02D 41/187 219/202 |
| 7,191,076 | B2 | * | 3/2007 | Huber | G01D 4/004 700/291 |
| 7,202,789 | B1 | * | 4/2007 | Stilp | G08B 25/002 340/568.2 |

(Continued)

FOREIGN PATENT DOCUMENTS

| | | |
|---|---|---|
| CN | 204290410 U | 4/2015 |
| CN | 105554412 A | 5/2016 |

(Continued)

OTHER PUBLICATIONS

English Translation of CN105554412, entitled "Photographing method and device on screen light compensation and mobile terminal".

(Continued)

*Primary Examiner* — M Baye Diao
(74) *Attorney, Agent, or Firm* — Andrew W. Spicer

(57) ABSTRACT

A method and device for sensing a temperature of a battery. A temperature of a power supply in an electronic device is monitored. One or more heat producing components of the electronic device are disabled when the monitored temperature of the power supply is higher than a first temperature. The one or more disabled heat producing components are restarted to restore electronic device functionality in an ordered manner when the monitored temperature of the power supply reaches a second temperature that is less than the first temperature.

21 Claims, 4 Drawing Sheets

(56) References Cited

U.S. PATENT DOCUMENTS

| | | | |
|---|---|---|---|
| 7,408,132 B2* | 8/2008 | Wambsganss | H02H 5/042 219/202 |
| 7,607,828 B2 | 10/2009 | Beier et al. | |
| 7,961,446 B2* | 6/2011 | Ide | H02M 1/32 361/103 |
| 8,453,000 B2* | 5/2013 | Ben-Tsion | G06F 11/1441 713/322 |
| 8,853,518 B2* | 10/2014 | Balogh | H02J 1/108 136/205 |
| 8,970,562 B2* | 3/2015 | Xu | G06F 1/206 345/204 |
| 8,993,136 B2* | 3/2015 | Robertson | H01M 10/6571 429/50 |
| 9,005,120 B2* | 4/2015 | Ryan | A61B 5/0008 600/301 |
| 9,423,152 B2* | 8/2016 | Ampolini | F24H 9/0005 |
| 9,469,202 B2* | 10/2016 | Miglioranza | B60L 50/64 |
| 9,592,543 B2* | 3/2017 | Elkins | G01V 9/007 |
| 9,604,631 B2* | 3/2017 | Li | B60W 10/30 |
| 9,711,670 B2* | 7/2017 | Grimes | H02J 7/35 |
| 9,735,613 B2* | 8/2017 | Orthlieb | H02J 3/00 |
| 9,996,068 B2* | 6/2018 | Lakshmanan | G05B 19/042 |
| 10,226,073 B2* | 3/2019 | Bless | H05B 1/0244 |
| 2003/0065459 A1* | 4/2003 | Huber | G01R 22/00 702/62 |
| 2003/0160715 A1* | 8/2003 | Maeda | H04M 1/67 341/144 |
| 2006/0043937 A1* | 3/2006 | Patino | H02J 7/0029 320/150 |
| 2006/0098371 A1* | 5/2006 | Wambsganss | H02H 5/042 361/103 |
| 2006/0282826 A1* | 12/2006 | Dockser | G06F 9/3869 717/127 |
| 2007/0052461 A1* | 3/2007 | Zhang | H02J 7/0029 327/150 |
| 2007/0235440 A1* | 10/2007 | Gu | G05D 23/1935 219/482 |
| 2008/0042621 A1* | 2/2008 | Miglioranza | H02J 7/1407 320/150 |
| 2009/0040259 A1* | 2/2009 | Kim | B41J 2/0458 347/17 |
| 2009/0164153 A1 | 6/2009 | Watanabe | |
| 2013/0017431 A1 | 1/2013 | Frisk et al. | |
| 2013/0022858 A1 | 1/2013 | Mazur et al. | |
| 2016/0261202 A1* | 9/2016 | Kikuchi | H02M 3/33523 |
| 2016/0360785 A1* | 12/2016 | Bless | H05B 1/0244 |
| 2019/0082114 A1* | 3/2019 | Jeon | H04N 5/247 |
| 2019/0166536 A1* | 5/2019 | Kim | G06F 1/3278 |
| 2020/0192443 A1* | 6/2020 | Huang | H04B 1/036 |
| 2020/0205662 A1* | 7/2020 | Lee | A61B 5/002 |

FOREIGN PATENT DOCUMENTS

| | | |
|---|---|---|
| WO | WO 2012100049 A1 | 7/2012 |
| WO | WO 2012100064 A1 | 7/2012 |

OTHER PUBLICATIONS

English Translation of CN204290410, entitled "One fills formula power source soon".

* cited by examiner

THERMAL SHUTDOWN WITH HYSTERESIS

TECHNICAL FIELD

The present disclosure generally relates to preventing batteries within devices from overheating and, more specifically, to sensing a battery temperature and enabling orderly shutdown and turn on of device processes.

BACKGROUND

Devices containing batteries, such as lithium-ion batteries, need to protect the battery from overheating. Overheating of a battery can reduce the life of the battery or cause a catastrophic failure, e.g. fire, explosion, etc. Overheating of batteries can also cause damage to the devices being powered thereby. Numerous methods exist for protecting the battery including fans, throttling back resources of the device and complete shutdown of the device. However, these methods each have certain limitations and drawbacks. While fans may be effective in cooling off a device and the battery, not all devices contain a fan or are large enough to include a fan of sufficient power to cool the device and battery. Certain devices throttle back device resources, e.g. processor speed, disabling heat producing components, etc., to reduce heat production, and then restore those resources in the reverse order that they were disabled as the battery cools. However, it is not always possible or desirable to restore the resources in the reverse order that they were disabled. Further, a complete shutdown of the device is not always desirable as it is generally desirable to maintain at least a minimum amount of safety related functionality, e.g. the ability to make a 911 or emergency call, of the device active during battery over-temperature events.

The present disclosure is directed towards overcoming these drawbacks.

SUMMARY

According to a first aspect of the disclosure, a method is described. A temperature of a power supply in an electronic device is monitored. One or more heat producing components of the electronic device are disabled when the monitored temperature of the power supply is higher than a first temperature. The one or more disabled heat producing components are restarted to restore electronic device functionality in an ordered manner when the monitored temperature of the power supply reaches a second temperature that is less than the first temperature.

In another embodiment, the power supply is a Lithium Ion Battery and the temperature being monitored is the temperature of the Lithium Ion Battery.

In another embodiment, disabling one or more heat producing components includes placing the electronic device in a low energy state.

In another embodiment, disabling certain heat producing components when the monitored temperature of the power supply rises to a third temperature higher than the second temperature and less than the first temperature.

In another embodiment, restoring the electronic device functionality in an ordered manner includes performing a soft reboot of the electronic device.

In another embodiment, disabling one or more heat producing components includes disabling components producing a greatest amount of heat.

In another embodiment, the method further comprises maintaining a log of each instance the monitored temperature rises above the first and third temperature and falls below the second temperature.

In another embodiment, the method further comprises generating a notification each time the monitored temperature rises above the first and third temperature and falls below the second temperature.

In another embodiment, resources supporting calls are maintained when the electronic device is placed in the low energy state.

In another embodiment, resources supporting calls are maintained during the soft reboot of the electronic device.

In another embodiment, disabling one or more heat producing components of the electronic device includes throttling back a speed of a microprocessor of the electronic device.

According to a second aspect of the disclosure, a device is provided. The device includes a communications module, a power supply providing power to the communications module, a sensor for monitoring a temperature of the power supply, a main processor connected to the communications module and components connected to the main processor. The components produce heat and are disabled when the monitored temperature of the power supply is higher than a first temperature. The disabled heat producing components are restarted to restore electronic device functionality in an ordered manner when the monitored temperature of the power supply reaches a second temperature that is less than the first temperature.

In another embodiment, the power supply is a Lithium Ion Battery.

In another embodiment, disabling the heat producing components place the electronic device in a low energy state.

In another embodiment, the device includes a plurality of heat producing components and only certain heat producing components are disabled when the monitored temperature of the power supply rises to a third temperature higher than the second temperature and less than the first temperature.

In another embodiment, the main processor restores the electronic device functionality in an ordered manner by performing a soft reboot of the electronic device.

In another embodiment, the device further includes a storage for storing a log of the monitored temperature rising above each of the first and third temperature and falling below the second temperature.

In another embodiment, the communications module generates a notification each time the monitored temperature rises above the first and third temperature and falls below the second temperature.

In another embodiment, components supporting communication are maintained when the electronic device is placed in the low energy state.

In another embodiment, components supporting calls are maintained during a soft reboot of the electronic device.

In another embodiment, disabling heat producing components includes throttling back a speed of the main processor.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
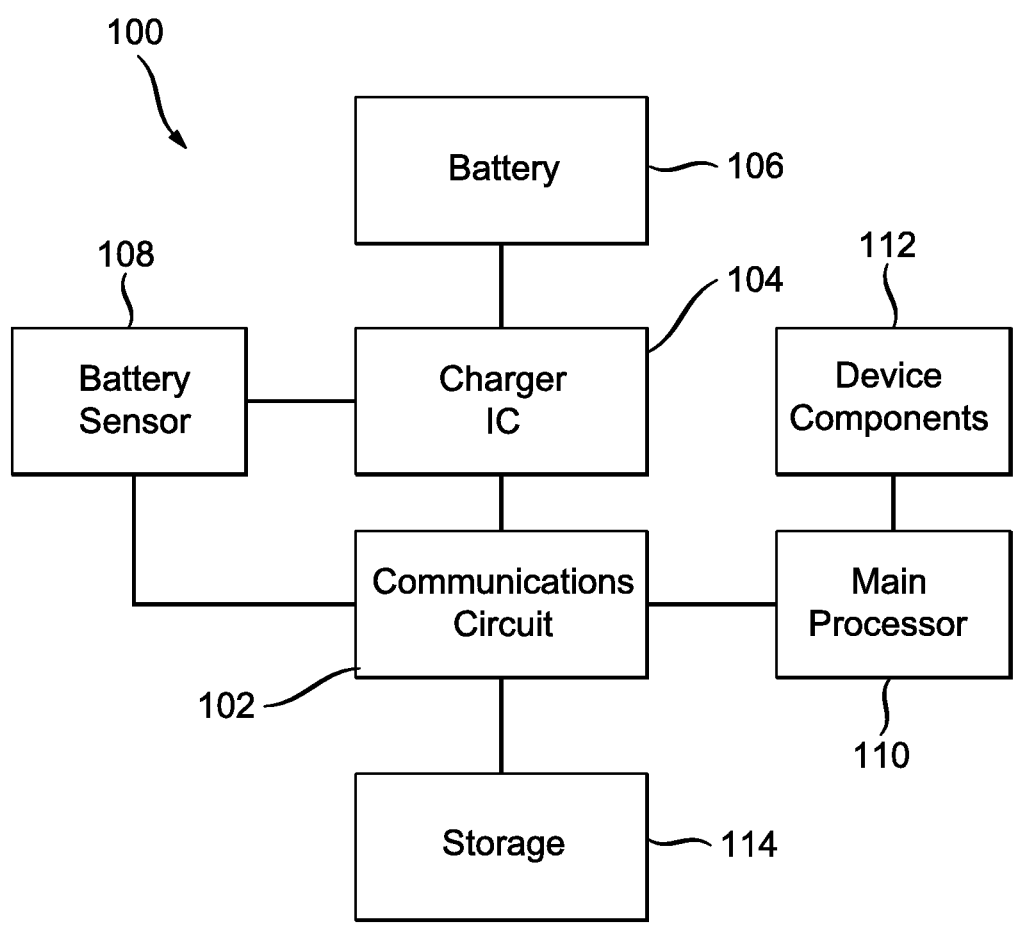
FIG. 1 is an exemplary block diagram of a system in accordance with the present disclosure.

It should be understood that the drawing(s) is for purposes of illustrating the concepts of the disclosure and is not necessarily the only possible configuration for illustrating the disclosure.

DETAILED DESCRIPTION

It should be understood that the elements shown in the figures may be implemented in various forms of hardware, software or combinations thereof. These elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and, are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present description provides a method and apparatus for safe and effective monitoring of battery temperature and cooling of the battery upon sensing of an over-temperature event. A sensor monitors the temperature of a battery and notifies a processor within the device when the over-temperature event is sensed. The processor will then disable certain heat producing resources of the device. Upon detecting the battery temperature falling below a safe temperature, the processor will conduct an orderly restoration of the disabled resources.

The present disclosure throttles back the devices resources upon measuring a temperature above certain trip temperatures but instead of simply re-enabling the resources in the reverse order they were disabled as the device cools, a cooled temperature below the trip temperatures is set so that when the battery cools below the cooled temperature, the device restarts/reboots itself to restore full functionality. The hysteresis is that the "cool down" temperature is lower than the over-temperature temperature to prevent the device from thrashing between modes. The device is restarted/rebooted to allow all devices and services to be restored in an orderly fashion.

FIG. 1 illustrates a block diagram of an exemplary device 100 incorporating the present arrangement. This process can be used in any device that uses a battery such as a Lithium ion battery, such as for example phones, laptops, etc. The exemplary device 100 includes a communications circuit 102 such as a Long-Term Evolution (LTE) module. A battery 106 is connected to a charger integrated circuit (IC) 104 and the charger IC 104 is connected between the communications module 102 and a battery 106, providing power for operation of the communications circuit 102.

The battery is generally seated within a battery compartment connected to the charger IC 104. A battery sensor 108 is connected between the charger IC 104 and the communications module 102. The battery sensor 108 senses the temperature of the battery, i.e. the external surface temperature of the battery and/or the heat radiated by the battery into the battery compartment, and, notifies the communications module 102 when the sensed temperature reaches a first trip temperature.

The communications module 102 is also connected to a main processor 110 for the device 100. The main processor 110 is connected to control other device components 112. The other device components may include a 5.0 GHz Wi-Fi, a 2.4 GHz Wi-Fi, a Zigbee® Radio, a Bluetooth® radio, a Z-Wave® radio, an Ethernet interface, etc. The above listing of other device components is exemplary and not exhaustive of possible components which may be connected to and controlled by the main processor 110. A storage device 114 may be connected to the communications module 102 for storing data such as a system history log identifying when the battery temperature reaches certain temperature levels. When the communications module 102 is notified by the battery sensor 108 that the sensed temperature has reached a certain level, the communications module 102 signals the main processor 110 to disable or re-enable certain of the device components 112 or possibly reboot the device to re-enable the disabled components in an orderly fashion.

Figure 2:
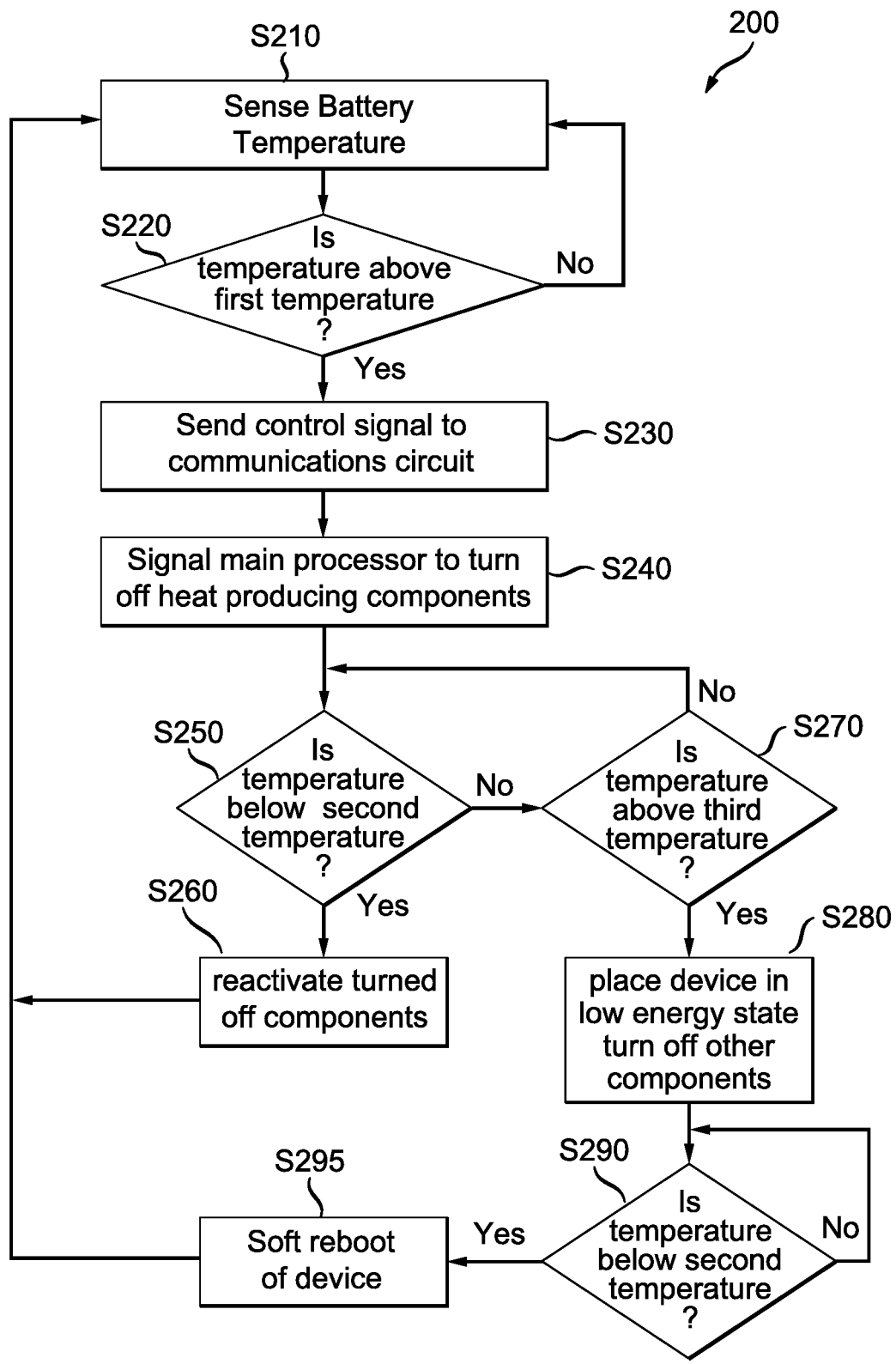
FIG. 2 is an exemplary flow diagram of the system in accordance with the present disclosure.

FIG. 2 is a flow diagram showing the process of the device 100 shown in FIG. 1. The process begins with normal operation of the device. During normal operation, the battery sensor of the device begins monitoring the battery temperature as described in S210. The temperature sensed by the battery sensor 108 is generally the external surface temperature of the battery and/or the heat radiated by the battery into the battery compartment. It is determined whether the sensed temperature exceeds a first trip temperature as stated in S220.

A first trip temperature for a normal device receiving power from a Lithium Ion battery may be 56° C. although any temperature above a normal or safe operating temperature for a device and the particular battery used thereby may be used as the first trip temperature. Upon sensing an over-temperature event in which the sensed temperature has exceeded the first trip temperature, a control signal is provided by the temperature sensor to the communications module as discussed in S230. The communications module signals the main processor to shut down heat producing resource(s) and/or components as described in S240.

The main processor may shut down resources or components producing a greatest amount of heat first in an orderly fashion and continues with resources producing less heat based on the sensed temperature. For example, when shutting down the heat producing resources or components the main processor may shut down a Wi-Fi radio, e.g. 5.0 GHz radio, producing an amount of heat greater than other components of the device first and reduce a processing speed of the main processor. The main processor may then log the over-temperature event in a system history log within the storage and enable display of notifications indicating the over-temperature event on the device.

The logging of the over-temperature event may include at least any of a sensed temperature and a time the sensed temperature increased above the first trip temperature. Display of notifications may be at least any of displaying a message on an OLED and Web User Interface (UI) (if active), flash an LED in a "Call to action" pattern, and send a "warning" alert message to a smart phone (if paired with the device). These notifications are provided for example only and notifications by the device may be in any manner able to produce a noticeable alert of the over-temperature event indicating that the sensed temperature has reached a certain level and heat producing resources or components are being shut-down so the device will produce less heat and thereby reduce the temperature to a safe level preventing damage, overheating or failure of the battery and/or the device. While in this mode, the battery sensor continues to monitor the battery temperature.

The battery sensor checks to determine if the battery temperature drops to a second trip temperature lower than the first trip temperature as stated in S250. A second trip temperature for a normal device receiving power form a Lithium Ion battery may be 54° C. although any temperature below the first trip temperature for the device and the particular battery used may be used as the second trip temperature. If the battery sensor determines that the battery temperature has dropped below the second trip temperature, the main processor is controlled to re-enable the disabled heat producing resource(s) or component(s) as discussed in S260.

The second trip temperature being lower than the first trip temperature adds hysteresis to the system preventing the system from thrashing between modes. When re-enabling the heat producing resources, the main processor may:
  a. Re-enable the disabled resources such as a 5.0 GHz Wi-Fi radio;
  b. Log the "cooled" event in the system history log;
  c. Remove the notifications such as from the device OLED and Web UI, and stop the "Call to action" flashing pattern on the LED; and/or
  d. Send a "cooled" alert to a paired smart phone or device.
The battery sensor may then return to normal operation continuing to sense the battery temperature at S210.

If the battery sensor does not sense the battery temperature has fallen below the second trip temperature, the battery sensor determines if the temperature has continued to rise above a third trip temperature as described in S270. The third trip temperature is greater than the first trip temperature. The third trip temperature for a normal device receiving power form a Lithium Ion battery may be 58° C. although any temperature above a normal operating temperature for a device and the particular battery used thereby may be used as the third trip temperature. If it is determined the battery temperature has not risen to the third trip temperature, the process returns to S250 and continues to check if the battery temperature has decreased below the second trip temperature. If it is determined that the battery temperature has risen above the third trip temperature, the device may be placed in a "low-energy" state as stated at S280. In a low energy state, the device should maintain certain essential resources in operation and disable other non-essential resources. For example, if able, the device should avow an attached communication device such as a phone to make calls as needed, e.g. to 911 for emergencies. In addition, placement of the device in the low energy state may include:
  a. Shutting down non-essential resources and components such as, in a gateway device for example, local smart home functionality (rules engine) and "smart home" radios (2.4 GHz Wi-Fi, Z-Wave® radio, Bluetooth® radio, Zigbee® radio);
  b. Throttle back the main processor speed;
  c. Log the higher over-temperature event in the system history log; and
  d. enable display of notifications on the device. Display of notification may be at least any of display a message on an OLED and/or Web User interface (UI) (if active), flash an LED in a "Call to action" pattern, and send an "overheated" alert message to a smart phone (if paired with the device). These notifications are provided for example only and notifications by the device may be in any manner able to provide an alert that the sensed battery temperature has reached a certain level and the device is being placed in a "low-energy" state to reduce the battery temperature to a safe level, minimizing or preventing damage, overheating or failure.

While in this mode, the device continues to monitor the battery temperature. It is then determined whether the battery temperature drops below the second trip temperature as discussed in S290. If it is determined that the battery temperature has not dropped below the second trip temperature, the device remains in the "low-energy" state and continues to monitor the battery temperature at S290. If it is determined that the battery temperature has dropped below the second trip temperature, the device begins a soft reboot, re-enabling the resources and components of the device in an orderly fashion as described in S295. When performing the soft reboot of the device, the main processor may:

a. Log the "normal temperature reboot" event to the system history log;

b. Send a "cooled" alert to a paired device; and c. Execute a soft reboot of the device.

During execution of the soft reboot, the host mainboard may be rebooted to restore full device functionality. The communications module may not be rebooted, allowing any on-going phone calls or communications to remain active.

Figure 3:
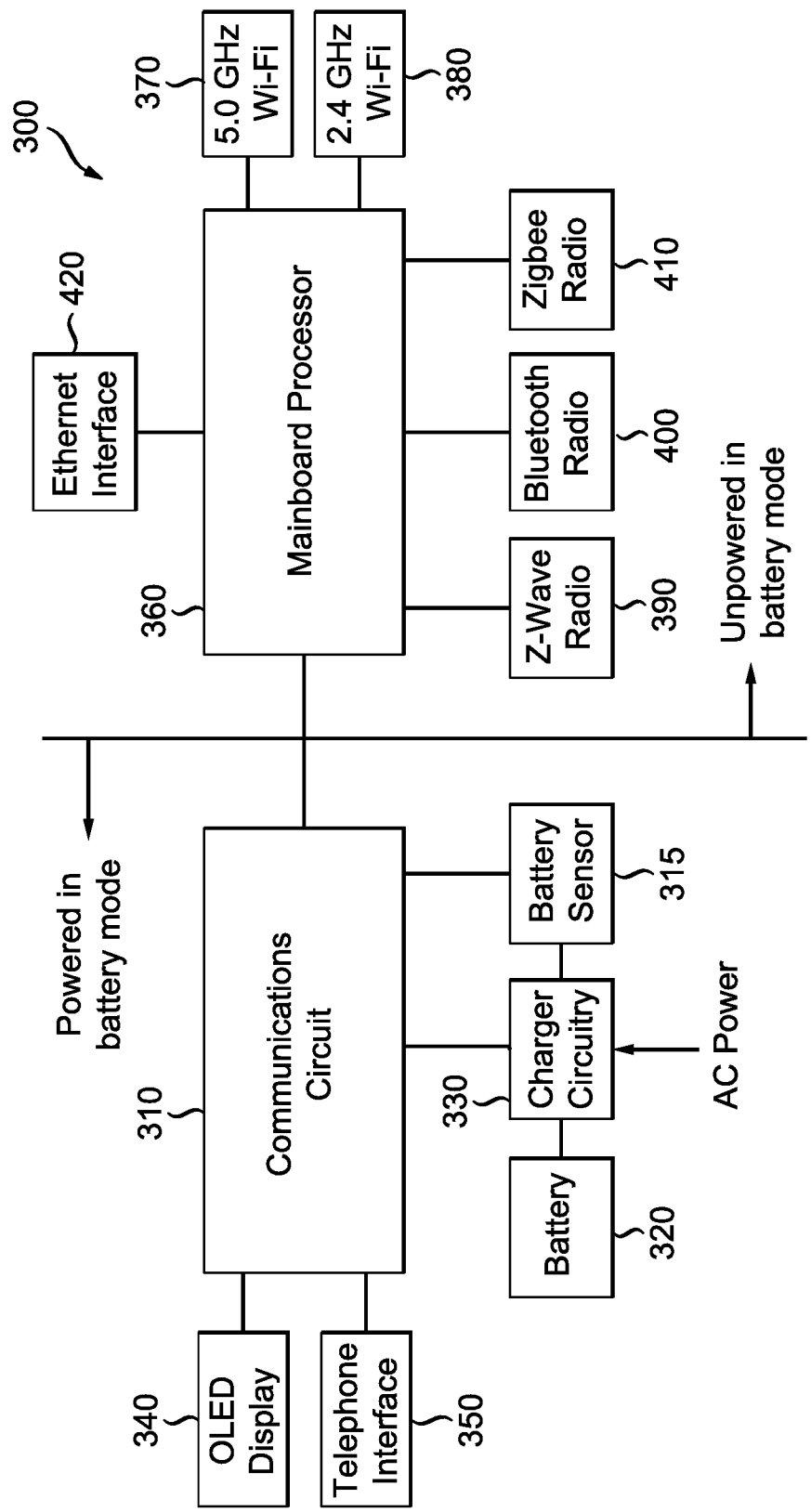
FIG. 3 is an exemplary block diagram of a system identifying an operational status of processes and elements within a device based on the battery mode in accordance with the present disclosure.

FIG. 3 illustrates a block diagram showing the status of resources and components for a smart home gateway system for controlling appliances and devices within a smart home after determining the battery temperature has risen above the third trip temperature. An exemplary smart home gateway system is the Technicolor smart home system which includes smart home (Internet of Things—IoT) features.

In-home sensors (such as door, window and flood sensors) and actuators (such as door locks and light bulbs) can be paired with the device through smart home radios, e.g. Z-Wave®, Bluetooth® and Zigbee®. The smart home configuration may be communicated to a cloud-based component through an LTE radio. Through the cloud, the Technicolor smart home system can also be paired with a smart device, e.g. Android® tablet or smartphone, Apple® iPhone, etc. The Technicolor smart home system can communicate smart home status information through the cloud to the smart device, and the smart device can be used to control the smart home sensors and actuators within the home. As mentioned above, this cloud interface is leveraged to allow the Technicolor smart home system to communicate thermal over-temperature and cooled-down events to the smart device. The Technicolor smart home gateway system is described for purposes of example. In practice any smart home system or other similar device may be used with and/or include the present disclosure. This process can also be used in any device that uses a Lithium ion battery, like phones, laptops, etc.

The gateway system 300 includes a radio 310, a battery 320 and a charger circuit 330 connecting the radio module 310 to the battery 320. The battery 320 is generally seated within a battery compartment connected to the charger circuit 330. A battery sensor 315 is connected between the charger circuit 330 and the radio 310. The battery sensor 315 senses the temperature of the battery 320, i.e. the external surface temperature of the battery 320 and/or the heat radiated by the battery 320 into the battery compartment, and, notifies the radio 310 when the sensed temperature reaches a first trip temperature.

An OLED display 340 and a telephone interface 350 may also be connected to the radio module 310. The OLED display 340 may communicate device/system status and other information such as over-temperature status and cooled status of the device. A mainboard processor 360 may be connected to the radio 310. The mainboard processor 360 may connect to and control a 5.0 GHz Wi-Fi radio 370 and a 2.4 GHz WiFi radio 380. Other radios such as a Z-Wave® radio 390, a Bluetooth® radio 400 and a Zigbee® radio 410 may also be connected to the mainboard processor 360. An Ethernet interface 420 may also be connected to the mainboard processor 360. Depending on the system configuration and operation, additional components controlled by the mainboard processor 360 may also be connected to the mainboard processor 360.

Upon determining by the battery sensor 315 that the battery temperature has risen above the third trip temperature, the gateway system 300 may enter a "low-energy" state. When entering the "low-energy" state, the radio module 310 controls the mainboard processor 360 to disable certain resources. The mainboard processor 360 may disable the 5.0 GHz Wi-Fi radio 370; 2.4 GHz WiFi radio 380; Z-Wave® radio 390; Bluetooth® radio 400; Zigbee® radio 410; and Ethernet interface 420 in an orderly fashion. The radio module 310 maintains the battery 320 and charger circuit 330 in an active state. The telephone interface 350 may also be maintained in an active state so the gateway system 300 is able to make emergency calls if necessary. The telephone interface is shown for purposes of example and in practice may be any interface through which a call or connection may be made. The OLED display 340 may also remain active to provide a notification as to the state of gateway system 300.

When in the "low-energy" state, the battery sensor 315 continues to monitor the battery temperature to determine when the temperature has fallen to a certain "cooled" temperature. Upon determining the battery temperature has fallen below the "cooled" or second trip temperature, the radio module 310 may begin a soft reboot of the mainboard processor 360 re-enabling the resources connected thereto in an orderly fashion.

Figure 4:
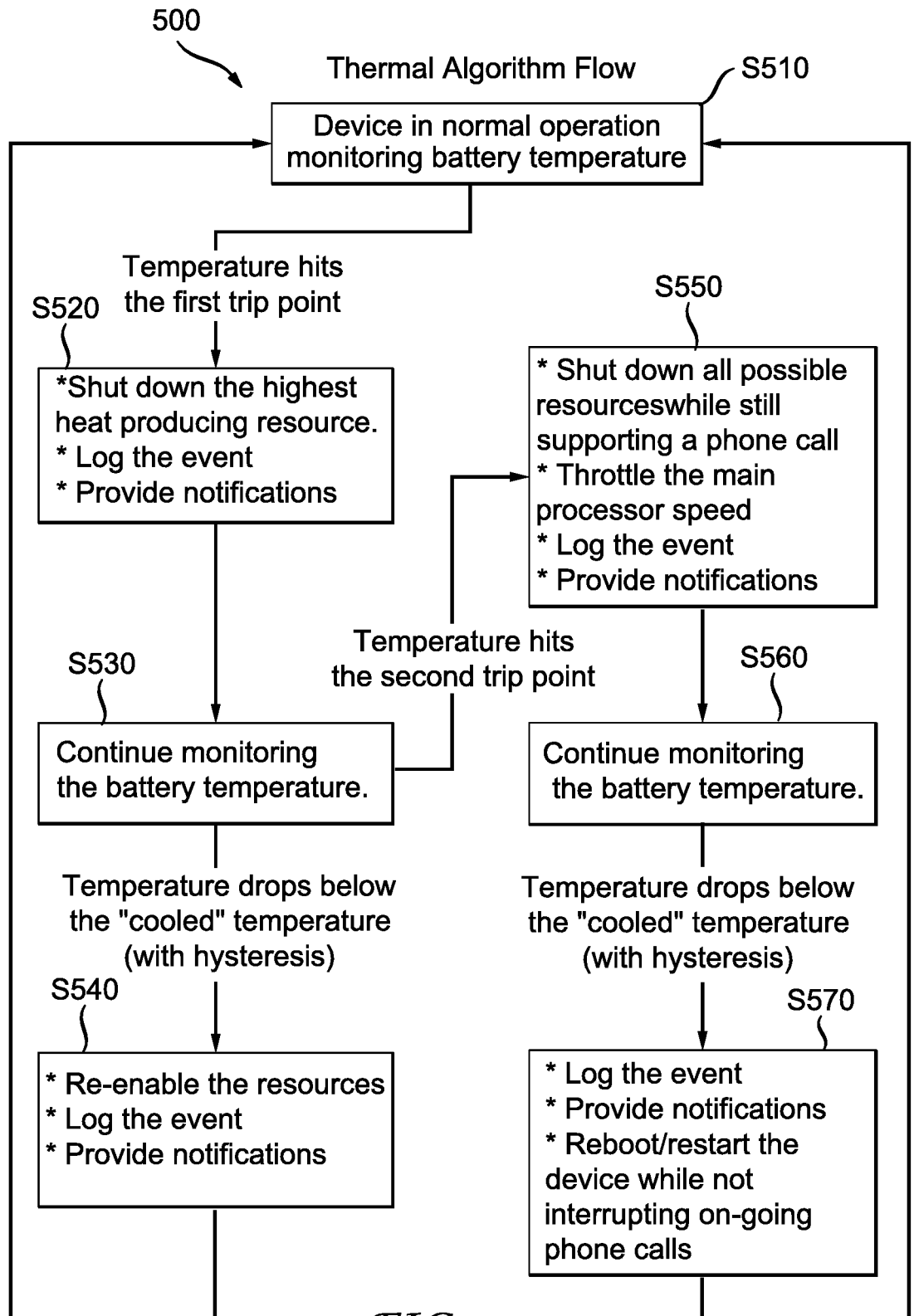
FIG. 4 is an exemplary flow diagram of the system in accordance with the present disclosure.

FIG. 4 is a flow chart illustrating the method 500 performed by the system to monitor the battery temperature and act to protect the device from failure due to overheating of the battery. In step S510, the system is in a normal operation state and the temperature of the battery is monitored. When it is detected that the battery temperature has reached a first trip temperature, the system shuts down or disables the highest heat producing resource(s), logs the event noting the reaching of the first trip temperature and provides notifications that the battery temperature has reached the first trip temperature and the highest heat producing resource(s) has been shut down in step S520.

The system continues to monitor the battery temperature in step S530. If it is determined that the temperature drops below a cooled temperature, the disabled resources are re-enabled, the cooling event is logged and notifications indicating the cooling of the battery temperature and re-enabling of resources is provided in step S540. The system then returns to step S510 to continue monitoring the temperature of the battery. If it is determined that the temperature rises above the first trip temperature to a second trip temperature, all possible resources except those supporting the ability to make calls or communicate may be shut down, the main processor speed may be throttled, the rising of the battery temperature above the second trip temperature may be logged and notifications of the temperature rising to the second trip temperature may be provided in step S550. The maintaining of the resources able to make phone calls in an active state enables the placing of emergency calls if necessary thus providing safety for users of the system.

Once the heat producing resources are shut down, the system continues to monitor the battery temperature to determine when the temperature falls below the cooled temperature in step S560. Once it is determined the battery temperature has dropped below the cooled temperature, the cooling event may be logged, notifications regarding the dropping of the temperature may be provided and a soft reboot/restart of the device may be initiated while maintaining operation of all maintained resources preventing the interruption of any on-going calls or communications in step S570. The system then returns to step S510 to continue monitoring the temperature of the battery.

Although embodiments which incorporate the teachings of the present disclosure have been shown and described in detail herein, those skilled in the art can readily devise many other varied embodiments that still incorporate these teachings. Having described preferred embodiments of a system and method for enhancing content (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A method, comprising:
monitoring a temperature of a power supply providing power to a communications module and communicating the monitored temperature to the communications module in an electronic device;
disabling, using a main processor coupled to the communications module, one or more heat producing components that are coupled to said main processor of the electronic device, when the monitored temperature of the power supply is higher than a first temperature; and
restarting, using the main processor, the one or more disabled heat producing components to restore electronic device functionality in an ordered manner when the monitored temperature of the power supply reaches a second temperature that is less than the first temperature.

2. The method of claim 1, wherein the power supply is a Lithium Ion Battery and the temperature being monitored is the temperature of the Lithium Ion Battery.

3. The method of claim 1, wherein disabling one or more heat producing components includes placing the electronic device in a low energy state.

4. The method of claim 3, further comprising disabling certain heat producing components when the monitored temperature of the power supply rises to a third temperature higher than the second temperature and less than the first temperature.

5. The method of claim 3, wherein restoring the electronic device functionality in an ordered manner includes performing a soft reboot of the electronic device.

6. The method of claim 1, wherein disabling one or more heat producing components includes disabling components producing a greatest amount of heat.

7. The method of claim 4, further comprising maintaining a log of each instance the monitored temperature rises above the first and third temperature and falls below the second temperature.

8. The method of claim 4, further comprising generating a notification each time the monitored temperature rises above the first and third temperature and falls below the second temperature.

9. The method of claim 3, wherein resources supporting calls are maintained when the electronic device is placed in the low energy state.

10. The method of claim 5, wherein resources supporting calls are maintained during the soft reboot of the electronic device.

11. The method of claim 1, wherein disabling one or more heat producing components of the electronic device includes throttling back a speed of a microprocessor of the electronic device.

12. A device, comprising:
a communications module;
a power supply providing power to the communications module;
a temperature sensor for monitoring a temperature of the power supply and communicating the monitored temperature to the communication module;
a main processor coupled to the communications module; and components coupled to the main processor, wherein the components producing heat are disabled by the main processor when the monitored temperature of the power supply is higher than a first temperature and the disabled heat producing components are restarted by the main processor to restore electronic device functionality in an ordered manner when the monitored temperature of the power supply reaches a second temperature that is less than the first temperature.

13. The device of claim 12, wherein the power supply is a Lithium Ion Battery.

14. The device of claim 12, wherein disabling the heat producing components place the electronic device in a low energy state.

15. The device of claim 14, wherein the device includes a plurality of heat producing components and only certain heat producing components are disabled when the monitored temperature of the power supply rises to a third temperature higher than the second temperature and less than the first temperature.

16. The device of claim 12, wherein the main processor restores the electronic device functionality in an ordered manner by performing a soft reboot of the electronic device.

17. The device of claim 15, further comprising a storage for storing a log of the monitored temperature rising above each of the first and third temperature and falling below the second temperature.

18. The device of claim 12, wherein the communications module generates a notification each time the monitored temperature rises above the first and third temperature and falls below the second temperature.

19. The device of claim 14, wherein components supporting communication are maintained when the electronic device is placed in the low energy state.

20. The device of claim 16, wherein components supporting calls are maintained during a soft reboot of the electronic device.

21. The device of claim 12, wherein disabling heat producing components includes throttling back a speed of the main processor.

* * * * *